W. H. SILVER.
Dessert-Maker.
No. 203,081. Patented April 30, 1878.
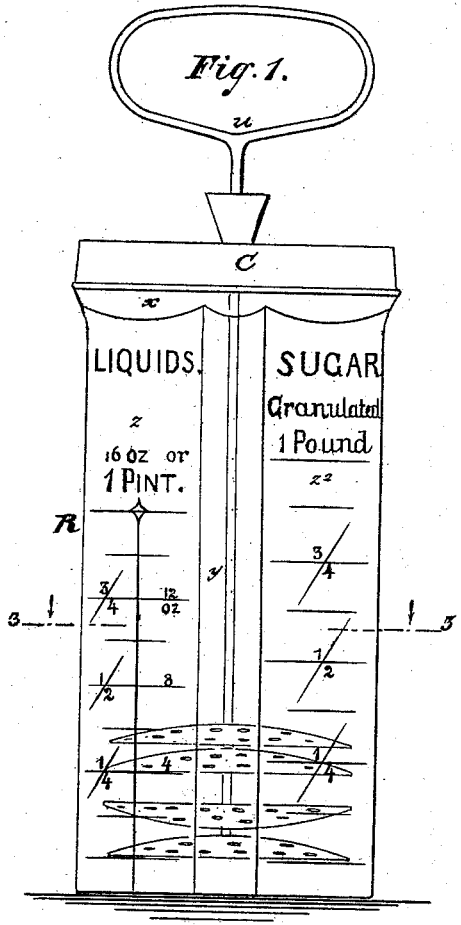
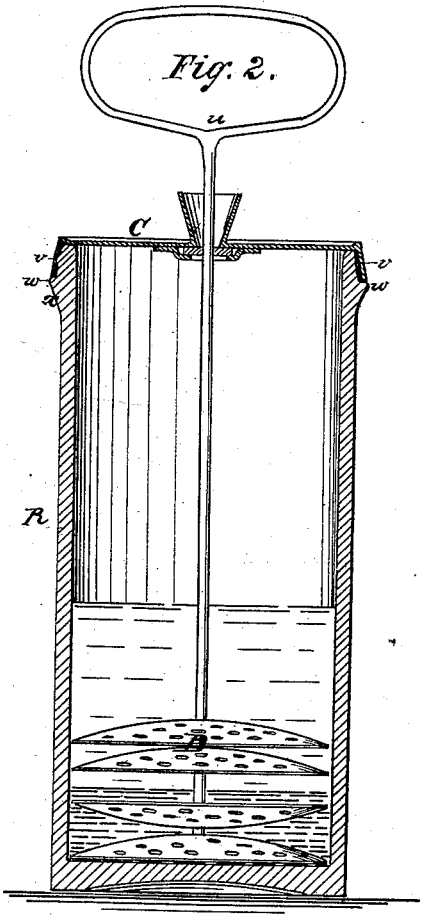
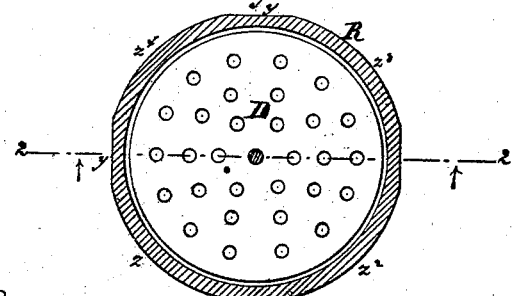
WITNESSES
INVENTOR

UNITED STATES PATENT OFFICE.

WILLIAM H. SILVER, OF NEW YORK, N. Y., ASSIGNOR TO ANN SILVER, OF ST. LOUIS, MO.

IMPROVEMENT IN DESSERT-MAKERS.

Specification forming part of Letters Patent No. 203,081, dated April 30, 1878; application filed April 1, 1878.

*To all whom it may concern:*

Be it known that I, WILLIAM H. SILVER, of the city and county of New York, in the State of New York, have invented a new and useful Improvement in Dessert-Makers, of which the following is a full, clear, and exact specification.

In making various dessert preparations it is necessary not only to measure several different ingredients, but also, usually, to beat the several ingredients, or two or more of the same, together until they assume a given consistency or shade of color, or until they are thoroughly mixed. For example, a recipe for "creams patissiere" is as follows: First, beat four whites of eggs to a very firm body, and then mix with them about one ounce of pulverized sugar; second, take four yolks of eggs and half a gill of milk, and beat well together until thoroughly mixed; third, take about two ounces of pulverized sugar, with a tea-spoonful of potato-starch and two-thirds of a gill of milk, mix the same well, then add the yolks and milk, and beat the whole well together, &c.

The prime object of my present invention is to provide for making desserts of the description above indicated by the aid of a mechanical beater, with the utmost facility for mixing the ingredients in the prescribed proportions, and for observing the progress of the operation.

To this end the invention consists in the employment of a receptacle of transparent glass, having one or more graduated scales thereon, so as to measure the different substances commonly employed, with or without a close cover, in combination with a reciprocating dasher, adapted to work in the said receptacle.

The glass receptacle in this combination is adapted to have parallel, or nearly parallel, sides and a perfectly smooth interior, so as to facilitate making it of pressed glass, and, more particularly, to render it easy to empty and clean. Pressing the glass in molds I have found by extensive experiments to be essential to distinctness and accuracy of graduations and symmetry of interior, and the readily-cleaned interior is of obvious importance. The requisite agitation is afforded by the dasher.

Figure 1 of the accompanying drawing is a side elevation of my improved dessert-maker. Fig. 2 is a vertical section of the same, illustrating its operation; and Fig. 3 is a transverse section.

Like letters of reference indicate corresponding parts in the several figures, and the planes of the respective sections are indicated by dotted lines, correspondingly numbered.

This dessert-maker consists of a vertical receptacle, R, of transparent glass, a tight-fitting close cover, C, of sheet metal, and a reciprocating dasher, D, the rod of which works through an aperture at the center of the cover. The dasher in the illustration is an adaptation of my metallic churn-dasher, patented June 15, 1875, United States Patent No. 164,491. Any other efficient dasher may be employed without departing from the present invention.

The glass receptacle R is pressed in a suitable mold by means of a plunger, which leaves a perfectly smooth and symmetrical chamber, cylindrical in form, excepting a slight flare, with a flat bottom and parallel, or nearly parallel, sides. No obstruction is, consequently, offered to the removal of the beaten contents and the thorough cleaning of the receptacle. Externally the said receptacle is provided with graduated sides $z\ z^2$, which indicate the quantity or weight of different substances as measured in said receptacle, and provide for mixing two or more of such substances in said receptacle, as indicated in Fig. 2, to be beaten together by the dasher D. The displacement of the latter is recognized in making the graduations, and the symmetrical interior of the receptacle, as made of pressed glass, adapts the graduations to be made very accurately. In the illustration, the exterior of the receptacle is divided into four longitudinal scale-surfaces, $z\ z^2\ z^3\ z^4$, by means of narrow flat stripes $y$, as shown in Fig. 3. Each of said surfaces is provided with an appropriate measuring-scale. Besides those shown in Fig. 1, which are for liquids and granulated sugar, scales for flour and coffee sugars occupy the said surfaces. More or fewer scales could obviously be used in a modification, and they can be specially adapted for given preparations, if preferred.

The receptacle R has a flat bottom, on which it stands steadily, and its upper end is adapted to receive the cover C. For this purpose an external thickening enlargement, $x$, is formed in the receptacle, and this affords the proper shape of seat and resistance to breakage without impairing the said smooth interior. The thick edge also provides for striking the dasher thereon without danger of breakage, for the purpose of removing the beaten mass edgewise from between the dasher-disks. A circumferential flange, $w$, and three or more isolated projections, $v$, afford ample clamping-surface for the rim of the cover, while they preclude the sealing of the cover by the contents.

Above the cover C the dasher D has a handle, $u$, formed by bending the wire dasher-rod into a loop, as shown.

In operation, one or more eggs may be beaten in a given quantity of milk or other liquid by measuring the latter in the receptacle by means of the appropriate scale, then adding the eggs, applying the cover, and reciprocating the dasher; or two or more substances of given quantity, as indicated by the respective scales, may be beaten together by the dasher, with or without eggs subsequently added.

The dasher is readily made to afford all necessary agitation without roughening the interior of the receptacle; and the latter provides for measuring the ingredients before they are beaten together, and for observing the operation, so as to obtain any desired effect, with even greater nicety than in an open bowl.

My dessert-maker is a most efficient egg-beater for all purposes; but its adaptation for mixing two or more ingredients is the basis of my present claims.

I do not claim the glass measuring-jar herein described, in itself considered; nor do I wish to cover by my claims a stationary agitator in combination with a glass receptacle having a contracted waist, this being old in egg-beaters.

The following is what I claim as new and of my own invention, and desire to secure by Letters Patent, namely:

1. The combination, in a dessert-maker, of a cylindrical, or nearly cylindrical, vertical receptacle, of transparent glass, having measuring-graduations on its outer surface, and a mixing and beating dasher, adapted to reciprocate within said receptacle, substantially as herein shown and described.

2. The combination, in a dessert-maker, of a cylindrical, or nearly cylindrical, vertical receptacle, of transparent glass, having graduations for different substances on its sides, a close cover tightly fitted to the top of said receptacle, and a reciprocating dasher, for mixing two or more ingredients within said receptacle, substantially as herein specified.

WM. H. SILVER.

Witnesses:
JAS. L. EWIN,
ISIDOR GRAYHEAD.